May 29, 1951 W. C. RANDALL 2,554,880

WINDOW CONSTRUCTION

Filed Sept. 10, 1945 5 Sheets-Sheet 1

*INVENTOR.*

WILLIAM CLIFTON RANDALL

*BY* Whittemore Hulbert & Belknap.

ATTORNEYS

May 29, 1951 W. C. RANDALL 2,554,880

WINDOW CONSTRUCTION

Filed Sept. 10, 1945 5 Sheets-Sheet 2

INVENTOR.
WILLIAM CLIFTON RANDALL
BY
Whittemore Hulbert & Belknap
ATTORNEYS

INVENTOR.
WILLIAM CLIFTON RANDALL
BY
Whittemore Hulbert & Belknap.
ATTORNEYS

May 29, 1951 W. C. RANDALL 2,554,880

WINDOW CONSTRUCTION

Filed Sept. 10, 1945 5 Sheets-Sheet 4

*INVENTOR.*
WILLIAM CLIFTON RANDALL
*BY*
Whittemore Hulbert & Belknap
ATTORNEYS

INVENTOR.
WILLIAM CLIFTON RANDALL
BY Whittemore,
Hulbert & Belknap
ATTORNEYS

Patented May 29, 1951

2,554,880

UNITED STATES PATENT OFFICE 2,554,880

WINDOW CONSTRUCTION

William Clifton Randall, Birmingham, Mich., assignor to Detroit Steel Products Company, Detroit, Mich., a corporation of Michigan Application September 10, 1945, Serial No. 615,385

6 Claims. (Cl. 189—69)

The invention relates to window constructions and refers more particularly to window constructions having both open-in and open-out ventilators.

The invention has for one of its objects to provide an improved window construction of the type having open-in and open-out ventilators and in which the frame members are of the same depth as the ventilator members.

The invention has for another object to provide an improved window construction of the open-in and open-out ventilator type in which the members forming the frame have coplanar inside faces and also coplanar outside faces and the members forming the ventilators also have coplanar inside faces and coplanar outside faces. As a result, handling of the frame and ventilators during manufacture, including welding, cleaning, painting, etc., and also stacking, are facilitated.

The invention has for further objects to form the window construction so that the swing-in and swing-out types of ventilators contact the frame respectively at the inside and outside thereof; to form the window construction so that the glass panes for both the swing-in and swing-out types of ventilators are in the same planes; and to form the side bars of the frames as units comprising a plurality of different sectioned bars welded together and ready for assembly with the other bars which complete the frame.

With these and other objects in view, the invention resides in the novel features of construction and combinations and arrangements of parts as more fully hereinafter set forth.

Figures 1, 2, 4, 5, 6, 7:
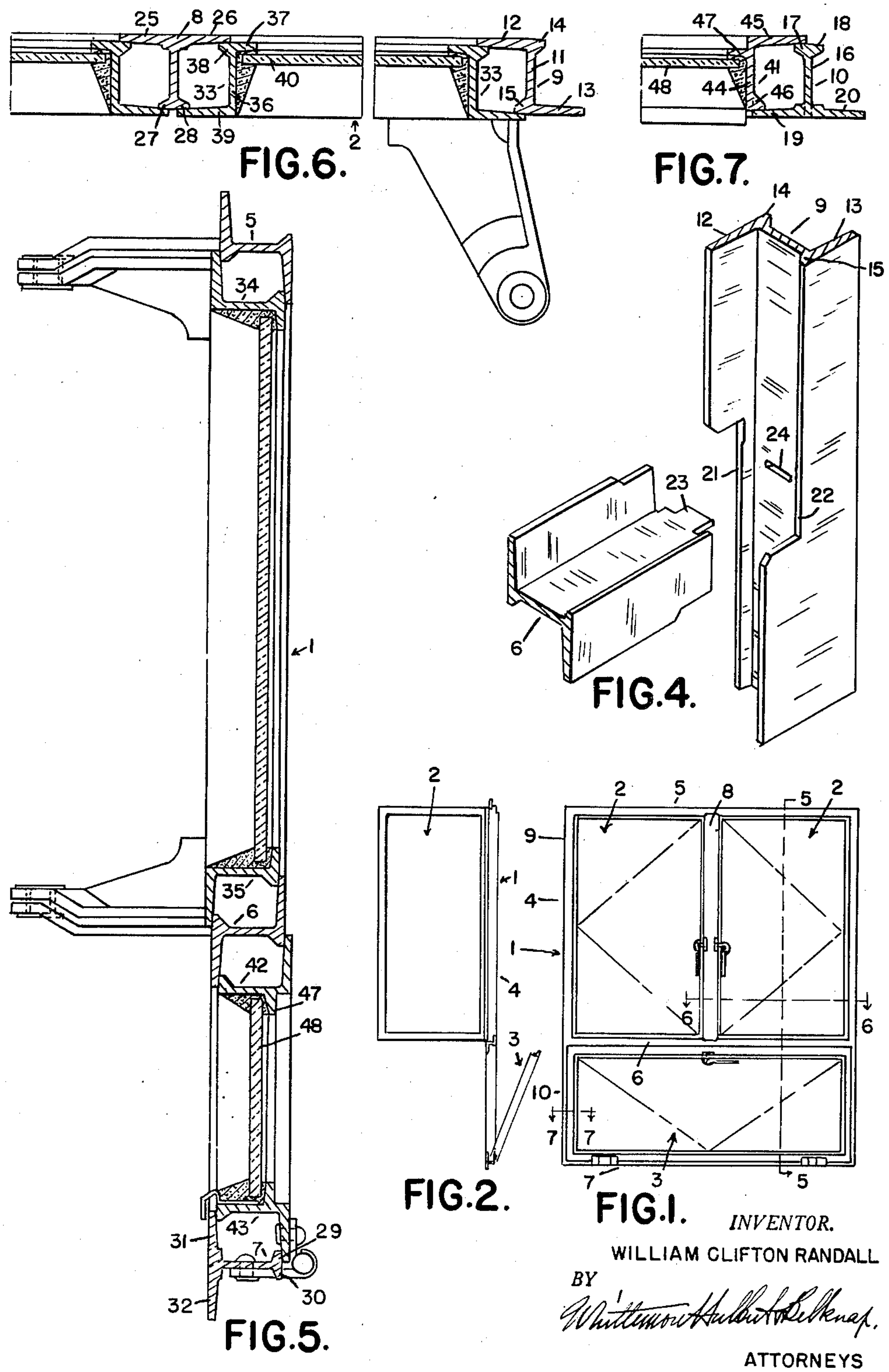
Figure 1 is a diagrammatic inside elevation of a window construction embodying the invention.
Figure 2 is a side elevation thereof.
Figure 4 is an enlarged perspective view, taken from the outside of adjacent portions of separated bars of the frame.
Figure 9:
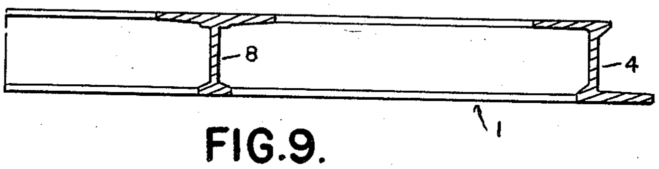
Figure 8:
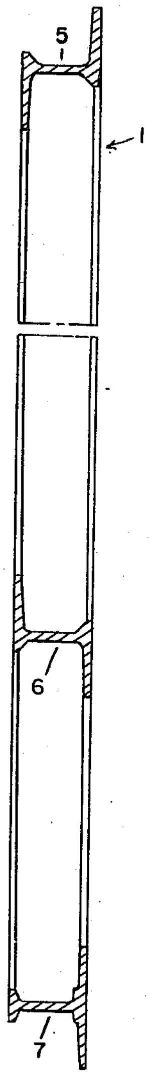
Figure 3:
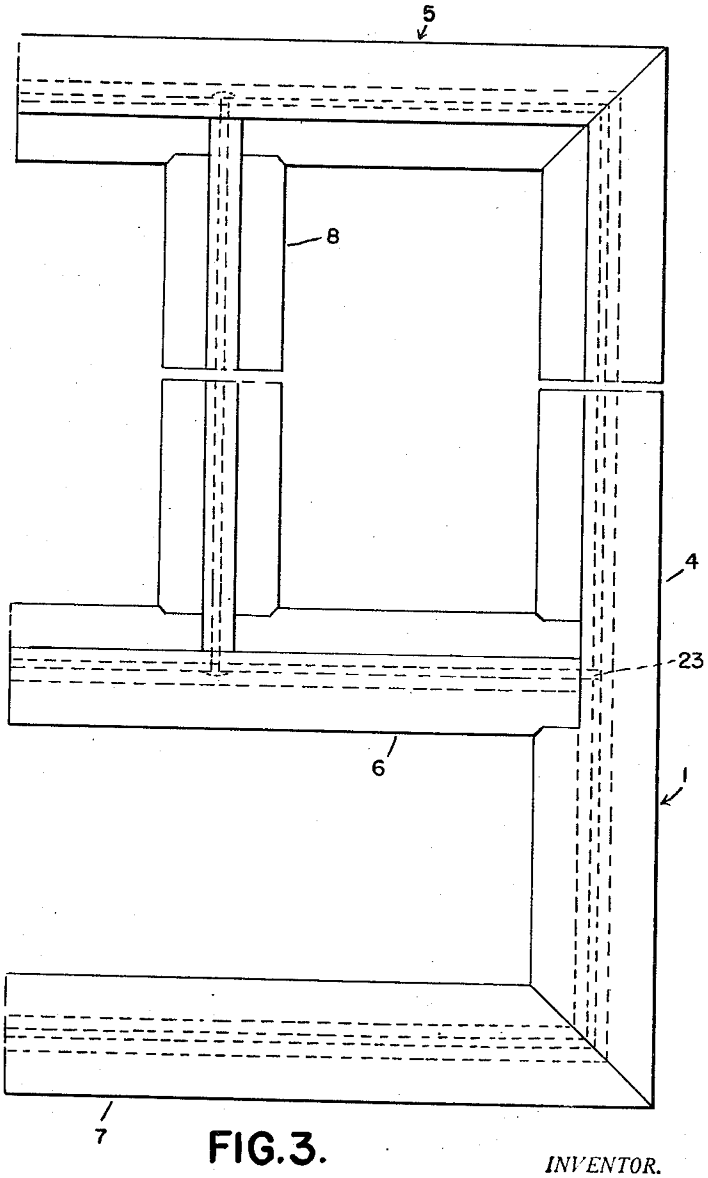
Figure 3 is an enlarged outside elevation partly broken away of the frame of Figure 1.
Figure 14:
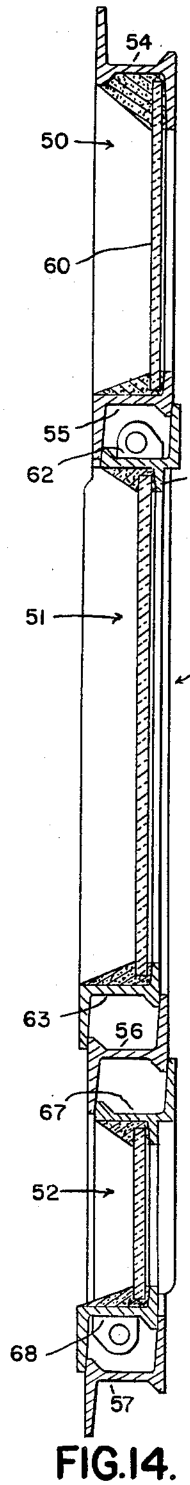
Figures 10, 11, 15, 16, 17:
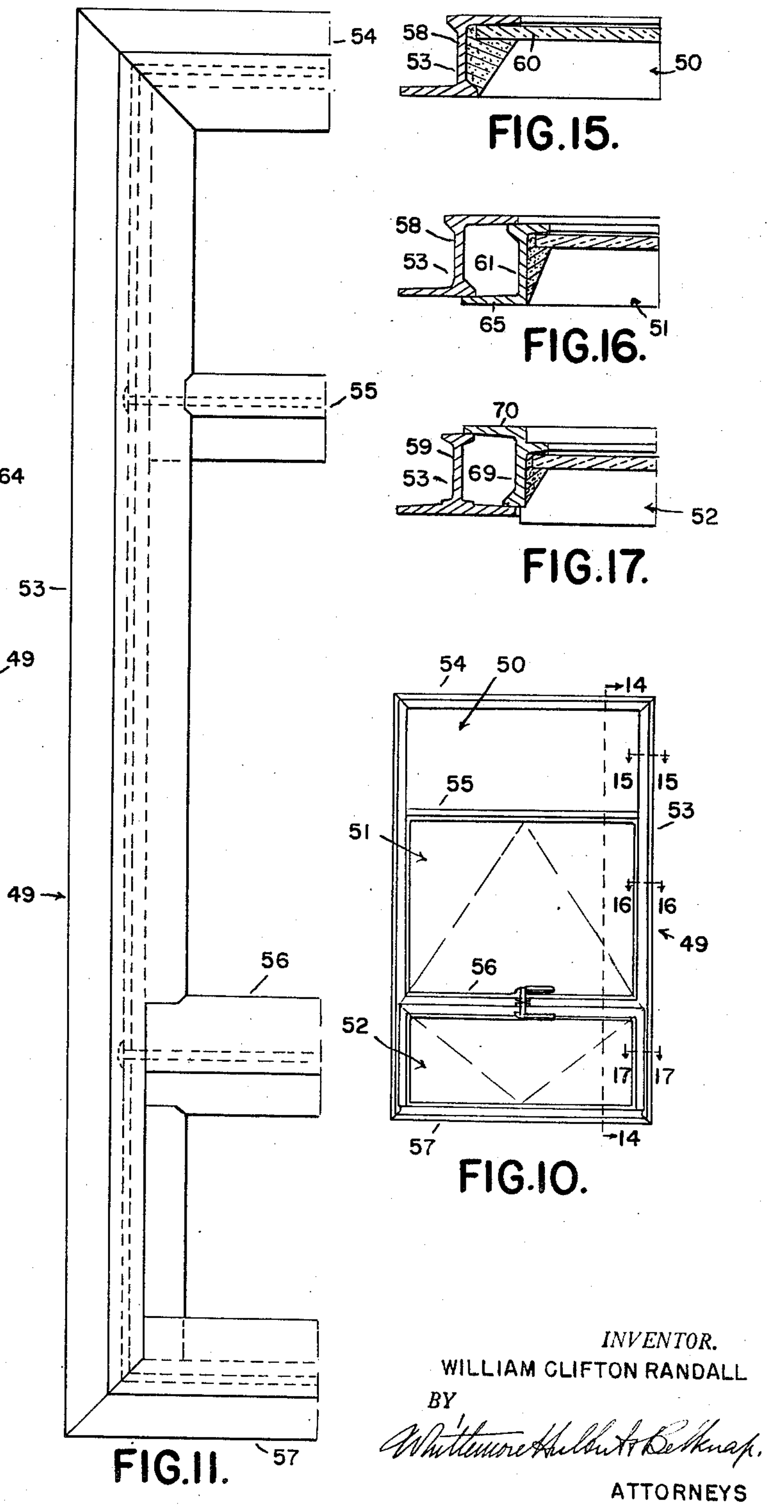
Figure 12:
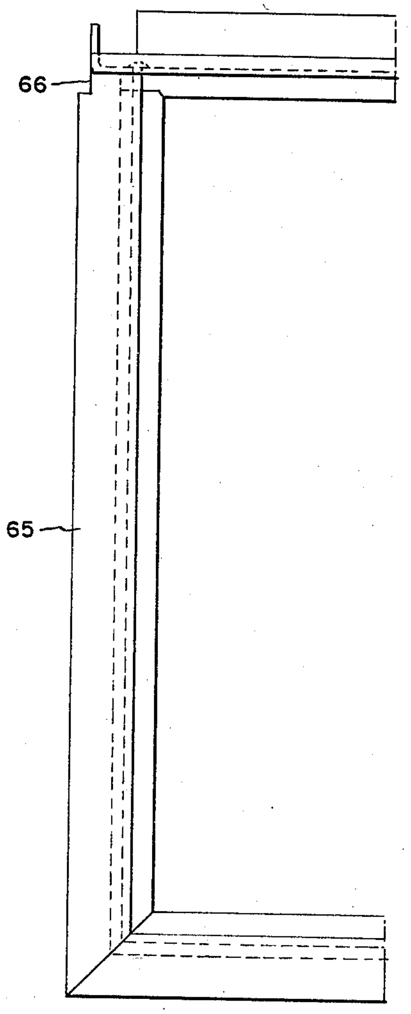
Figure 13:
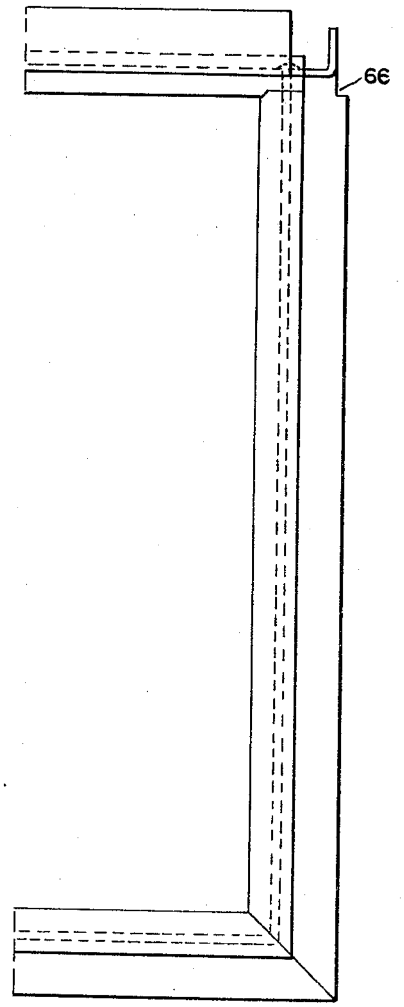
Figures 18, 19:
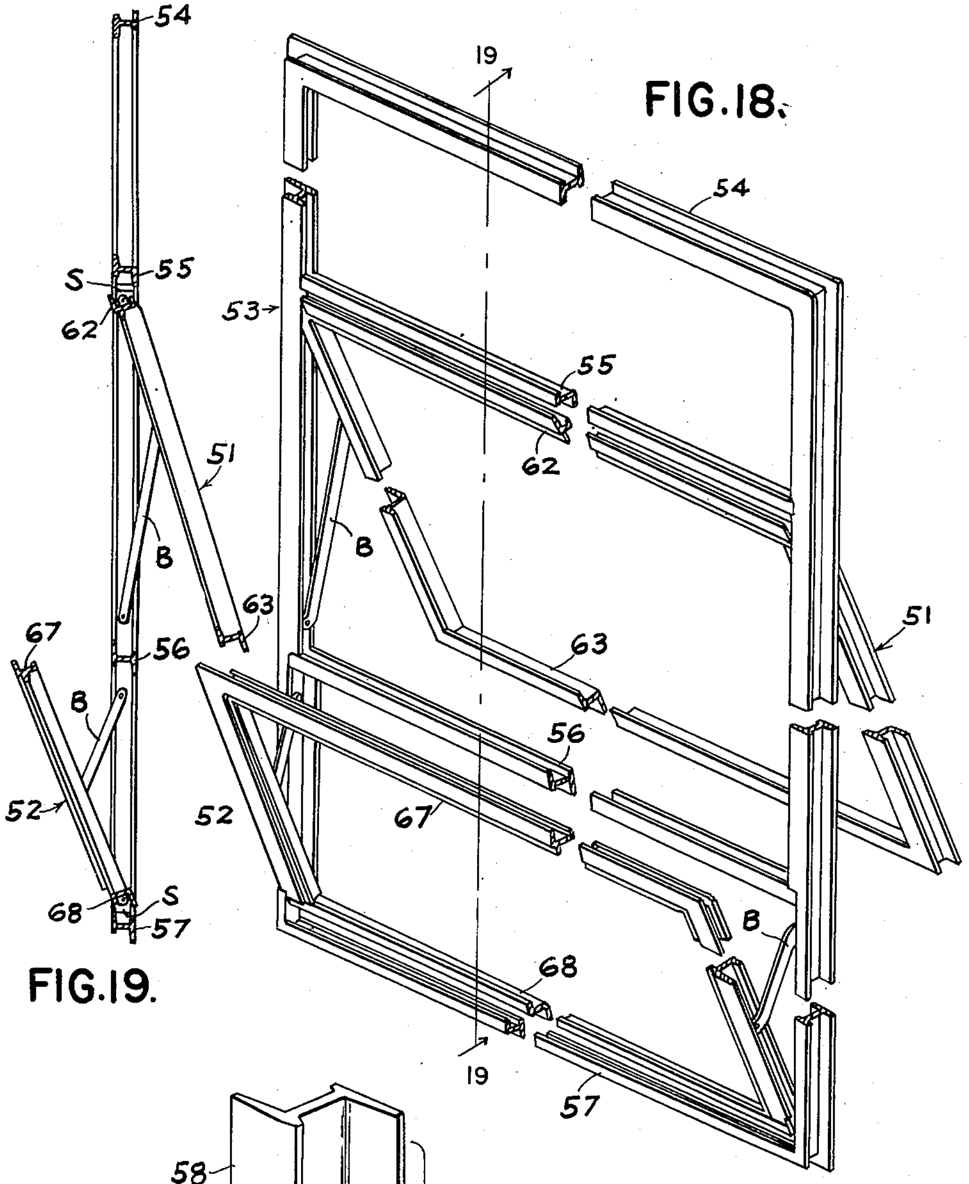

Figures 5, 6, and 7 are enlarged cross sections on the lines 5—5, 6—6, and 7—7, respectively, of Figure 1;

Figures 8 and 9 are views similar to Figures 5 and 6 showing the frame only;

Figure 10 is a view similar to Figure 1 showing a modified window construction;

Figure 11 is an enlarged view partly broken away of the frame of Figure 10;

Figures 12 and 13 are, respectively, enlarged outside and inside elevations of the upper ventilator of Figure 10;

Figures 14, 15, 16, and 17 are enlarged cross sections on the lines 14—14, 15—15, 16—16, and 17—17, respectively, of Figure 10;

Fig. 18 is a perspective view of the window construction shown in Figs. 10–17, showing the ventilators in partly open position;

Fig. 19 is a vertical section on the line 19—19 of Fig. 18; and

Figure 20:
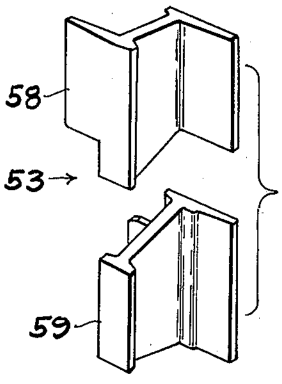

Fig. 20 is a view illustrating the manner in which the side frame bars are connected together.

The window construction of Figures 1 to 9, inclusive, comprises the frame 1, the open-out ventilators 2 and the open-in ventilators 3, each of the open-out ventilators being hinged at its outer side to swing outwardly and the open-in ventilator being hinged at the bottom to swing inwardly.

The frame 1 is formed of the side bars 4, the top bar 5, the intermediate cross bar 6, the bottom bar 7 and the intermediate longitudinal bar 8, the bars 5, 6 and 7 extending transversely of and being connected to the bars 4 and the bar 8 extending transversely of and being connected to the bars 5 and 6 midway between the bars 4. The construction is such that the bars form the openings which are adapted to be closed by the ventilators 2 and 3.

Each of the side bars 4 of the frame is a unit comprising a plurality of different sectioned bar elements 9 and 10 welded together in end to end relation and having flush or coplanar inside and outside faces. The bar element 9 is of Z-shaped cross section, while the bar element 10 is of T-shaped cross section. The bar element 9 has the web 11, the inside and outside flanges 12 and 13, respectively, of the same width and the inside and outside beads 14 and 15, respectively, also of the same width and in alignment with the inside and outside flanges. The flanges and beads taper in thickness in a direction away from the web and the inside faces of the inside flange and bead are flush or coplanar, as are also the outside faces of the outside flange and bead. The bar element 10 has the web 16 and the aligned inside beads 17 and 18 of the same width and also the aligned outside flanges 19 and 20 of the same width, both the beads and flanges tapering in thickness in a direction away from the web. The inside faces of the inside beads are flush or coplanar, as are also the outside faces of the outside flanges. The width of the beads of both bar elements 9 and 10 is less than the width of the flanges. The bar elements have their webs 11 and 16 in alignment and their beads 14 and 18 are of the same width, as are also their flanges 13 and 20, so that the edges of these beads are in alignment, as are also the edges of these flanges. The inside faces of the inside flange 12, inside bead 14 and inside beads 17 and 18 are flush or coplanar with each other. The outside faces of the outside flange 13, outside bead 15, and outside flanges 19 and 20 are flush or coplanar. The adjacent end portions of the inside flange 12 and the outside flange 19 are cut away to receive an end of the intermediate cross bar 6 which is of the same Z-shaped cross section as the bar element 9 and also has its inside and outside flanges cut away. The cutting is accomplished preferably by means of shearing apparatus set to predeterminedly shear the side bars and intermediate cross bar so that they accurately fit each other. The shearing of the inside flange 12 and outside flange 19 provides the seats 21 and 22 on these flanges, respectively, which are of substantial thickness to give an extended bearing area for the ends of the inside and outside flanges of the intermediate cross bar. The bar elements 9 and 10 are welded together along a diagonal line so that the seats 21 and 22 extend past each other longitudinally of the side bar. The intermediate cross bar is rigidly connected to the side bars by forming the ends of the intermediate cross bar with the projecting portions 23 which extend through the holes 24 punched in the webs of the side bars and have their ends riveted over against the webs.

The top bar 5 is also of the same Z-shaped cross section as and is rigidly connected to the bar elements 9, the ends of top bar and bar elements being mitered and preferably welded together. The intermediate longitudinal bar 8 is of the same T-shaped cross section as the bar element 10 and is rigidly connected to the top bar 5 and the intermediate cross bar 6 with its flanges 25 and 26 at the inside and its beads 27 and 28 at the outside. The inside flange and outside bead of the top bar and the inside flange and outside bead of the intermediate cross bar and also the inside flanges and outside beads of the intermediate longitudinal bar are cut away in suitable shearing apparatus so that the intermediate longitudinal bar accurately fits the top bar and the intermediate cross bar. The intermediate longitudinal bar is also formed at its ends with projecting portions similar to the projecting portions 23 which extend through the webs of the top bar and intermediate cross bar and are riveted thereover to rigidly connect the bars to each other. The bottom bar 7 is also of the same T-shaped cross section as the bar element 10 and it is rigidly connected to the bar elements preferably by mitering the ends of the bottom bar and bar elements and welding these ends together. The bottom bar has the beads 29 and 30 at the inside and the flanges 31 and 32 at the outside.

The side bars 4, the top bar 5, the intermediate cross bar 6, the bottom bar 7, and the intermediate longitudinal bar 8 are formed in units to be directly assembled and rigidly connected to complete the frame. The inside flanges of the bar elements 9, top bar 5, intermediate cross bar 6, and intermediate longitudinal bar 8 all extend inwardly of and border the openings at the inside of the frame for the ventilators 2. Also, the outside beads of the same bar elements and bars extend inwardly of and border the openings at the outside of the frame for the ventilators 2. The inside flanges and outside beads form outwardly facing seats for the ventilators 2. The inside beads of the bar elements 10, intermediate cross bar 6 and bottom bar 7 all extend inwardly of and border the opening at the inside of the frame for the ventilator 3. Also, the outside flanges of the same bar elements and bars extend inwardly of and border the opening at the outside of the frame for the ventilator 3. The inside beads and outside flanges form inwardly facing seats for the ventilator 3.

The ventilators 2 are each formed of the side bars 33 and the top and bottom bars 34 and 35, respectively, which extend transversely of and are rigidly connected to the side bars. The bars 33, 34 and 35 are of the same modified Z-shaped cross section having the web 36, the inside flange 37 and bead 38 in alignment with each other and the outside flange 39, the inside flange being shorter than the outside flange and forming a ledge against which is secured the glass pane 40. The inside faces of the ventilators are flush or coplanar, as are also the outside faces. The ventilator 3 is formed of the side bars 41 and the top and bottom bars 42 and 43, respectively, which extend transversely of and are rigidly connected to the side bars. The bars 41, 42 and 43 are of the same L-shaped cross section having the web 44, the inside flange 45 and the outside bead 46, both the flange and bead extending in the same direction away from the web. The inside faces of the bars 41, 42 and 43 are flush or coplanar as are also the outside faces. To enable positioning the glass pane of the ventilator 3 in the same plane as the glass panes of the ventilators 2 when the ventilators are closed, the bars 41, 42 and 43 are provided with the ledges 47 which are offset toward the outside from the inside faces of the inside flanges a distance to properly position the glass pane 48 which is secured against the ledges 47.

All of the bars of the frame and of the ventilators are of the same depth and the open-out ventilators are adapted to overlie and engage spaced outwardly facing seats of the frame, while the open-inventilator is adapted to overlie and engage spaced inwardly facing seats of the frame.

Figures 10 to 17, inclusive, illustrate a modified window construction in which the ventilators are of the projected-in and projected-out types. In this window construction the bars forming the frame and the ventilators are all of the same depth, and all of the bars forming the frame have flush or coplanar inside and outside faces. However, one bar of each of the ventilators is offset from the other bars so that its inside and outside faces are in different planes than the inside and outside faces of the associated bars. Furthermore, the offset bar is reversed with respect to the associated bars so that in one case it may overlie and contact the outside face of the cooperating bar of the frame and in another case it may overlie and contact the inside face of the cooperating bar of the frame, and the associated bars in either case may overlie and contact the other faces of their respective cooperating frame bars. The arrangement in either case provides for effective weatherproofing.

The modified window construction comprises the frame 49, the fixed light 50, the projected-out ventilator 51, and the projected-in ventilator 52. The frame 49 is formed of the side bars 53, the top bar 54, the intermediate upper and lower cross bars 55 and 56, respectively, and the bottom bar 57. The bars 54, 55, 56 and 57 extend transversely of and are rigidly connected to the side bars 53 in the same manner as the like bars are connected to the side bars of Figures 1 to 9, inclusive.

Each of the side bars 53 is a unit comprising a plurality of bar elements 58 and 59 welded together in end to end relation and having flush or coplanar inside and outside faces. The bar element 58 is of the same Z-shaped cross section as the bar element 9, and the bar element 59 is of the same T-shaped cross section as the bar element 10. The top bar 54 is of the same Z-shaped cross section as the bar element 58, while the intermediate upper cross bar 55 is of the same modified Z-shaped cross section as the bar 33. The upper portions of the bar elements 58, the top bar 54, and the intermediate upper cross bar 55 border the opening closed by the fixed glass pane 60. The bar 55 has its narrower width flange forming a ledge for the glass pane. The intermediate lower cross bar 56 is of the same Z-shaped cross section as the bar elements 58. The lower portions of the bar elements 58, the intermediate upper cross bar 55, and the intermediate lower cross bar 56 border the opening adapted to be closed by the projected-out ventilator 51. The lower portions of the bar elements and the intermediate lower cross bar have beads and flanges respectively at the outside and inside of the frame presenting outwardly facing seats for engagement by the side bars and bottom bar of the projected-out ventilator. The intermediate upper cross bar has its wider width flange and bead respectively at the outside and inside of the frame and presenting inwardly facing seats for engagement by the upper bar of the projected-out ventilator. The bottom bar 57 is also of the same Z-shaped cross section as the bar element 58. The bar elements 59, the intermediate lower cross bar 56, and the bottom bar 57 border the opening adapted to be closed by the projected-in ventilator 52. The bar elements and the intermediate lower cross bar have flanges and beads respectively at the outside and inside of the frame presenting inwardly facing seats for engagement by the side top bars of the projected-in ventilator. The bottom bar is arranged to have a bead and a flange respectively at the outside and inside of the frame presenting outwardly facing seats for engagement by the lower bar of the projected-in ventilator.

The projected-out ventilator 51 is formed of the side bars 61 and the top and bottom bars 62 and 63 respectively. The side bars 61 and the bottom bar 63 are of the same modified Z-shaped cross section as the bar 55, while the top bar 62 is of the same L-shaped cross section as the bar 41. The side bars 61 and bottom bar 63 are arranged with their wider flanges at the outside and their beads at the inside. The top bar 62 is arranged with its flange at the inside and its bead at the outside. The inside and outside faces of the side bars and bottom bar are flush or coplanar. However, the top bar is offset inwardly so that its inside and outside faces are in different planes than the corresponding faces of the associated bars, and its ledge 64 is in the same plane as the narrower flanges of the side bars and bottom bar. The upper end portions of the wider flanges 65 of the side bars 61 are cut away at 66 so that the projected-out ventilator may have its top bar engage the inwardly facing seats of the intermediate upper bar of the frame and its side bars and bottom bar engage the outwardly facing seats of the lower portions of the bar elements 58 and the intermediate lower bar of the frame. Also the cut-away portions provide for swinging outwardly of the lower portion of the ventilator and combined annular and rectilinear movement of the upper portion of the ventilator, the ventilator having the usual construction of pivotal shoes S and balance arms B.

The projected-in ventilator 52 has the same arrangement of top and bottom bars 67 and 68 respectively as the top and bottom bars 62 and 63. The side bars 69 are of the same L-shaped cross section as the top bar 67, and these bars have their inside and outside faces in the same planes. The flanges 70 of the side bars are cut away at their lower ends in the same manner as the flanges 65 to provide for the bottom bar 68 engaging the outwardly facing seats of the bottom bar 57 and to also provide for the top bar 67 and side bars 69 engaging the inwardly facing seats of the cooperating bars of the frame.

In the above description, the ribs of the various bar elements and bars have been specifically designated as flanges and beads to more clearly describe the construction.

For uniformity in the claims, the language "inwardly of the ventilator opening" refers to a direction toward the center of the opening from the sides thereof. The term "outwardly of the ventilator opening" refers to the opposite direction. To designate opposite sides of the window or window elements, the expression "room side" and "weather side" is employed. In referring to the bars making up the window frame and the ventilator frame, the "depth" of the bars is their transverse dimension measured between the room side and the weather side thereof.

The flanges and beads of the frame bars extend inwardly in the plane of the frame and are located respectively at the weather side or the room side thereof. The flanges and beads of the ventilator bars extend outwardly in the plane of the ventilator and are located respectively at the weather or room sides thereof. The arrangement is such that a double weather seal is provided at each edge of the ventilator, each of the seals being accomplished by the engagement between the inner surface of a flange on one of the bars against the side (and specifically the bead) of the other bar. To accomplish this result one of the bars of the frame and the corresponding bar of the ventilator are reversed with respect to the remaining bars thereof as to the sides at which the flange and bead are disposed. Furthermore, the last mentioned ventilator bar is offset with respect to the remaining ventilator bars to permit its flange to engage the side of the frame opposite to that which is engaged by the flanges of the remaining ventilator bars.

The drawings and the foregoing specification constitute a description of the improved window construction in such full, clear, concise and exact terms as to enable any person skilled in the art to practice the invention, the scope of which is indicated by the appended claims.

What I claim as my invention is:

1. In a window construction, a frame comprising integral metal side and transverse bars defining a plurality of ventilator openings, said frame bars having inwardly extending weathering flange and bead elements integral therewith at the weather side and room side thereof, the weather side surfaces of all of said bars including their flange and bead elements being coplanar and the room side surfaces of all of said bars including their flange and bead elements being coplanar to form smooth continuous weather side and room side surfaces, each of said side frame bars having an inwardly extending flange element at the weather side and an inwardly extending bead element at the room side at a first one of said ventilator openings, and an inwardly extending flange element at the room side and an inwardly extending bead element at the weather side of a second ventilator opening, a ventilator for each of said ventilator openings comprising side and transverse integral metal ventilator bars, each of said ventilator bars being of the same depth as said frame bars, each of said ventilator bars having an outwardly extending weathering bead and flange integral therewith at opposite sides thereof, means including a sliding pivot for mounting one of said ventilators adjacent one of its transverse bars for opening movement toward the room side in said first ventilator opening, means including a sliding pivot for mounting another ventilator for opening movement adjacent one of its transverse bars toward the weather side in said second ventilator opening, the transverse ventilator bar adjacent the sliding pivot of each of said ventilators being offset from the remainder of the ventilator bars of each ventilator in a direction opposite to that in which the ventilator swings in opening, the flanges of the offset ventilator bars overlapping the bead on the adjacent frame bar when the ventilator is closed.

2. In a window construction, a frame comprising integral metal side and transverse frame bars of uniform depth defining a first opening for receiving a ventilator opening toward the room side, and a second opening for receiving a ventilator opening toward the weather side, each of said frame bars having a weathering bead and flange integral therewith at opposite sides thereof extending inwardly of the ventilator openings, the surface of the frame bars including their beads and flanges being coplanar at the room side and at the weather side of said frame, sliding pivot means in said ventilator openings, first and second ventilator frames in said first and second frame openings respectively and carried by said pivot means, the ventilator frames comprising integral metal side and transverse ventilator bars each of which has an outwardly extending weathering flange and bead integral therewith at opposite sides thereof, said ventilator bars being of the same depth as said frame bars, the ventilator frame opening toward the room side being connected to its pivot means adjacent its bottom, the ventilator frame opening toward the weather side being connected to its pivot means adjacent its top, the portions of the frame bars surrounding the sides and top of the first opening having their flanges at the weather side, the frame bar at the bottom of said first opening having its flange at the room side, the ventilator bars at the top and sides of said first ventilator having their flanges at the room side thereof, the ventilator bar at the bottom of said first ventilator having its flange at the weather side, and being offset toward the weather side from the remaining bars in said ventilator frame to cause its flange to weather against the weather side of the bead on the adjacent frame bar, the portions of the frame bars surrounding the sides and bottom of said second opening having their flanges at the room side thereof, the frame bar at the top of said second opening having its flange at the weather side, the ventilator bars at the bottom and sides of said second ventilator having their flanges at the weather side, the ventilator bar at the top of said second ventilator having its flange at the room side and being offset toward the room side from the remaining bars in said second ventilator frame to cause its bead to weather against the room side of the flange on the adjacent frame bar.

3. In a window construction, a frame comprising side and transverse frame bars of uniform depth defining a first opening for receiving a ventilator opening toward the room side and a second opening for receiving a ventilator opening toward the weather side, each of said frame bars having a weathering bead and flange at opposite sides thereof extending inwardly of the ventilator openings, the surfaces of said frame bars including their beads and flanges being coplanar at the room side and at the weather side thereof; first and second ventilators in said first and second openings respectively, each comprising ventilator bars of the same depth as said frame bars and having a weathering flange and bead at opposite sides thereof extending outwardly parallel to the plane of the ventilator; the flanges on the frame bars at top and sides of said first opening being at the weather side, the flange on the frame bar at the bottom of said first opening being at the room side, the flanges at the top and sides of said first ventilator being at the room side and the flange at the bottom of said ventilator being at the weather side, pivot means for said first ventilator slidable vertically in said first opening and pivotally connected to said first ventilator adjacent its lower edge, the lower bar of said first ventilator being offset from the remaining ventilator bars in said first ventilator toward the weather side; the flanges on the frame bars at the bottom and sides of said second opening being at the room side, the flange on the frame bar at the top of said second opening being at the weather side, the flanges at the bottom and sides of said second ventilator being at the weather side, the flange at the top of said second ventilator being at the room side, pivot means for said second ventilator slidable vertically in said second opening and pivotally connected to said second ventilator adjacent its upper edge, the upper bar of said second ventilator being offset from the remaining ventilator bars in said second ventilator frame toward the room side.

4. A window construction as defined in claim 3 in which said openings are adjacent each other and separated by a single transverse frame bar having oppositely disposed beads and flanges extending both upwardly and downwardly therefrom.

5. A window construction as defined in claim 3 in which the length of the flanges of the transverse ventilator bars adjacent the pivot mounting is less than the space between the flanges at opposite sides of the frame to permit the last mentioned ventilator flanges to move between said side frame flanges.

6. A window construction as defined in claim 3 in which said side frame bars are unitary integral members in which the relative position of beads and flanges are reversed opposite said first and second openings.

WILLIAM CLIFTON RANDALL.

(References on following page)

REFERENCES CITED

The following references are of record in the file of this patent:

UNITED STATES PATENTS

| Number | Name | Date |
|---|---|---|
| Re. 20,540 | Johnson | Oct. 26, 1937 |
| 1,489,450 | Mesker | Apr. 8, 1924 |
| 1,615,823 | Barclay | Feb. 1, 1927 |
| 1,907,091 | Pettit | May 2, 1933 |
| 1,925,817 | Plym | Sept. 5, 1933 |
| 1,948,152 | Zimmerman | Feb. 20, 1934 |
| 1,999,208 | Peremi et al. | Apr. 30, 1935 |
| 2,033,832 | Kelly | Mar. 10, 1936 |
| 2,077,808 | Peremi et al. | Aug. 20, 1937 |
| 2,403,565 | Triller | July 9, 1946 |

FOREIGN PATENTS

| Number | Country | Date |
|---|---|---|
| 20,837 | Great Britain | Sept. 28, 1903 |
| 289,069 | Great Britain | Aug. 9, 1928 |
| 399,486 | Great Britain | Sept. 22, 1933 |
| 413,036 | Great Britain | July 12, 1934 |
| 496,628 | Great Britain | Dec. 2, 1938 |